Feb. 16, 1965  H. B. PUCKETT ETAL  3,169,799
AUGER FEED INJECTOR FOR PNEUMATIC CONVEYER
Filed Jan. 11, 1963  3 Sheets-Sheet 1

INVENTORS
H. B. PUCKETT
H. H. KLUETER

BY R. Hoffman
ATTORNEY

Feb. 16, 1965     H. B. PUCKETT ETAL     3,169,799
AUGER FEED INJECTOR FOR PNEUMATIC CONVEYER

Filed Jan. 11, 1963     3 Sheets-Sheet 3

INVENTOR
H. B. PUCKETT
H. H. KLUETER

BY *R. Hoffman*

ATTORNEY

United States Patent Office 3,169,799
Patented Feb. 16, 1965

3,169,799
AUGER FEED INJECTOR FOR
PNEUMATIC CONVEYER
Hoyle B. Puckett and Herschel H. Klueter, Champaign,
Ill., assignors to the United States of America as represented by the Secretary of Agriculture
Filed Jan. 11, 1963, Ser. No. 250,969
3 Claims. (Cl. 302—50)

A non-exclusive, irrevocable, royalty-free license in the invention herein described throughout the world for all purposes of the United States Government, with the power to grant sub-licenses for such purposes, is hereby granted to the Government of the United States of America.

This invention relates to a system for distributing particulate material from a source of supply to a number of distant points where it is desired to use the material. More specifically the invention relates to an apparatus for injecting feed into a pneumatic distribution system which distributes the feed to, for example, one or more poultry houses, barns, or the like on a farm.

It is one object of this invention to provide an apparatus for automatically injecting feed into a distribution system. Another object is to provide such an apparatus which will inject the feed into a pneumatic distribution system whereby the feed will be carried through conduits in an air stream to the points where it will be utilized.

In general, the objects of the invention are accomplished by means of a hopper source of supply which is provided with one or more augers for injecting the feed into a mixing chamber from which it is conveyed by an air stream through the distribution system.

In a preferred form of the invention, the feed is conveyed from the hopper by means of a horizontal auger to a vertical auger, which in turn is connected to a mixing chamber by means of a tapered vertical duct.

So that the invention may be fully understood by those skilled in the art, reference is made to the following description and to the accompanying drawings in which.

In general, the injector assembly of this invention comprises a hopper which is mounted over a horizontal auger, a duct connecting the horizontal auger with an enclosed vertical auger, a tapered duct, flaring outwardly in an upward direction connecting the vertical auger with a mixing chamber, means for rotating the augers, and means for conducting a stream of air to and removing air-conveyed feed from the mixing chamber.

Figure 1:
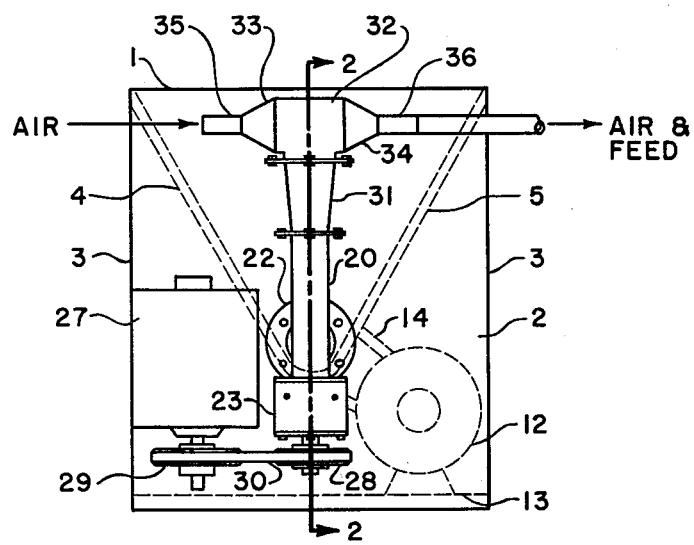
FIGURE 1 is a front elevation of a preferred embodiment of the injector assembly.
Figure 2:
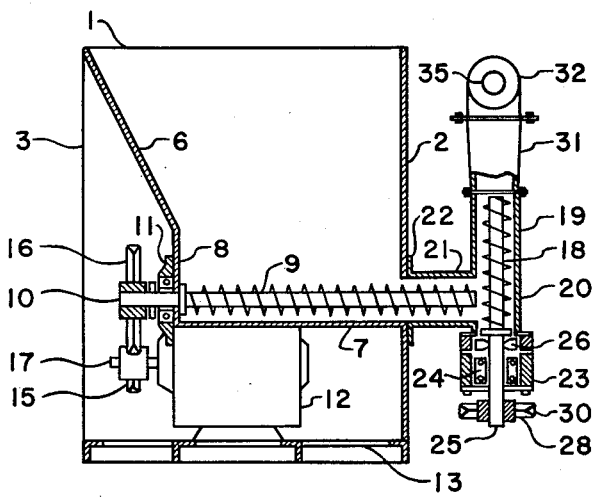
FIGURE 2 is a side elevation section taken on line 2—2 of FIGURE 1.

In particular, as shown in FIGURES 1 and 2, the injector comprises an open top chamber 1 having a front wall 2 and side walls 3 to form a hopper. The inside of the hopper is provided with sloping walls 4, 5, and 6 meeting at their lower extremities to form an open-top trough 7. Rear wall 6 has a vertical portion 8 through which extends a horizontal exposed auger 9. Auger 9 is provided with a rearwardly extending shaft 10 and is mounted on wall 8 for rotation by means of bearing 11. A motor 12, mounted on chamber floor 13 outside the hopper, drives auger 9 by means of belt 14 and pulleys 15 and 16 secured to motor shaft 17 and auger shaft 10, respectively.

Auger 9 is longer than trough 7 and its output end extends a short distance out through front wall 2 of chamber 1. A vertical auger 18 is enclosed in housing 19 which is formed of a vertical section 20 and a connecting horizontal section 21. The horizontal section 21 is long enough to enclose the output portion of auger 9 which projects through front wall 2 and to permit the forward end of the horizontal auger to be in close proximity to the input end of vertical auger 18. The vertical auger 18, together with its housing 19, is mounted on front wall 2 of the chamber by means of flange 22 attached to horizontal section 21. At the lower end of the vertical section 20 of housing 19 there is secured a housing 23, inside of which is a bearing 24 for rotatably mounting auger 18 by means of its shaft extension 25. A seal 26 prevents feed (not shown) from filling housing 23. Vertical auger 18 is driven by means of motor 27, mounted on front wall 2, through pulleys 28 and 29 and belt 30.

Secured to the upper end of housing 19 is an upwardly extending tapered duct 31. This duct is of smaller cross sectional area at its bottom than at its top where it is joined to mixing chamber 32. This mixing chamber is generally cylindrical and is horizontally disposed. At each end there is a conical section 33 and 34 which joins the mixing chamber to air inlet 35 and air and feed outlet 36, respectively. Air inlet 35 is connected to a source of compressed air (not shown). By making the lower end of duct 31 narrower than the top, the air pressure in mixing chamber 32 will tend to pack the injected feed more tightly at the lower end and provide an effective seal against air blowing down into the auger housing 19 and back through the horizontal auger to the hopper. Auger 18 has sufficient power to continuously force feed up into mixing chamber 32 where the feed is picked up by the air stream.

Figure 3:
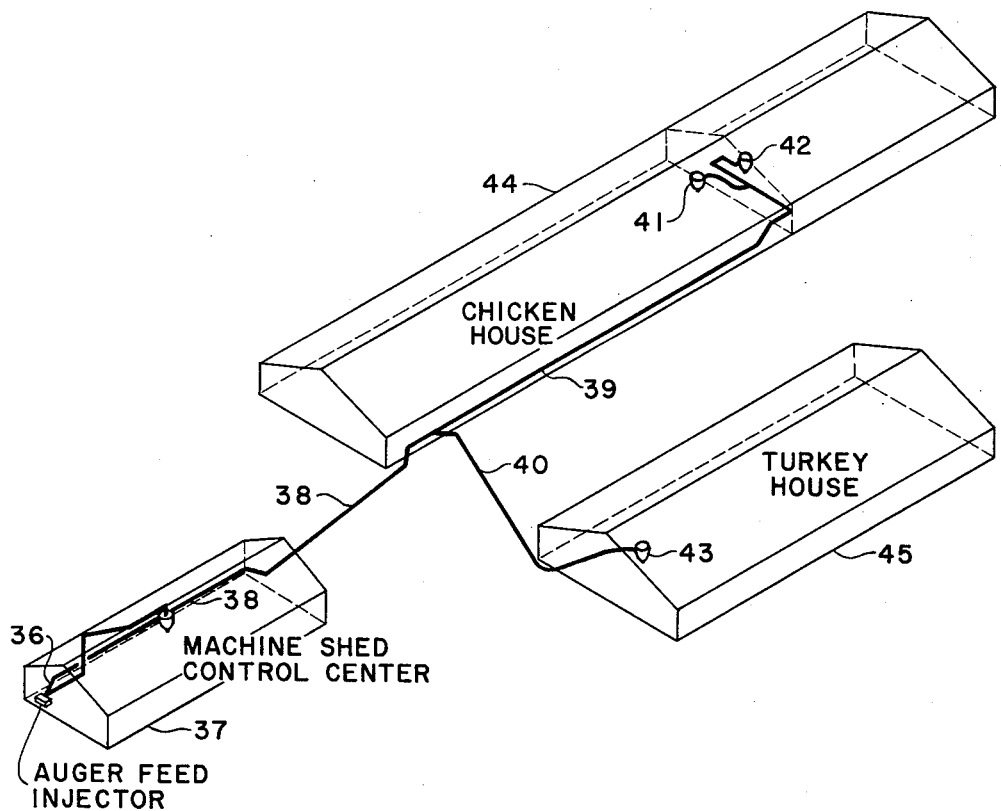
FIGURE 3 is a schematic illustration of a representative system in which the present invention can be used.

The feed injector just described can be made part of a distribution system, as illustrated in FIGURE 3.

Thus, as shown in FIGURE 3, the injector and its control equipment (not shown) can be installed in a separate shed 37. The outlet tube 36 is connected to duct 38 which, in turn, is connected to duct 39 in chicken house 44 and to duct 40 in turkey house 45. Duct 39 can terminate in hoppers 41 and 42 disposed above feeding troughs (not shown) and duct 40 can terminate in hopper 43, disposed above a feeding trough (also not shown).

Figure 5:
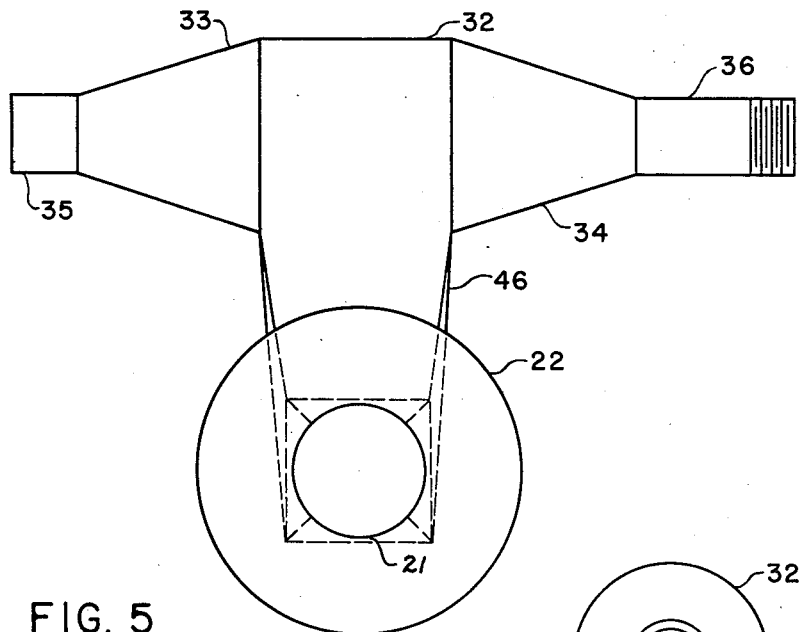
FIGURE 5 is a rear view of the conduit of FIGURE 4, with the auger omitted.
Figure 4:
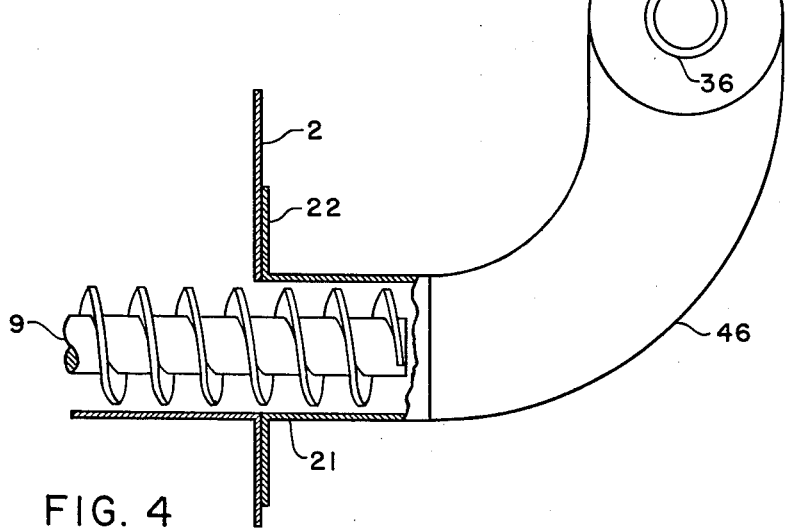
FIGURE 4 is a side elevation, with parts broken away, showing another embodiment of the invention employing only one auger.

A modification of the above-described injector is shown in FIGURES 4 and 5.

In this modification, the vertical auger 18 is dispensed with and replaced by a curved tapered duct 46. Duct 46 may be connected by its smaller end to the same horizontal duct 21 shown in FIGURE 2 and mounted on front wall 2 of the injector housing by means of flange 22. If desired, curved, tapered duct 46 can be made integral with the horizontal duct 21. The upper, larger, end of duct 46 is connected to mixing chamber 32 which is the same as that shown in FIGURES 1 and 2. As can be seen from FIGURES 4 and 5, the smaller end of duct 46 which encloses the projecting end of auger 9 is circular in cross-section and constitutes a cylindrical section which is coaxial and substantially coextensive with the projecting end of the auger. Because this tapered duct is narrower at the bottom, feed will pack there, as in the case of vertical housing 19, and act as a seal to prevent air from blowing back around auger 9.

As an example of the embodiment shown in FIGURES 1 and 2, the horizontal and vertical augers can each be about 1⅞ inches outside diameter and ⅞ inch pitch, with a center shaft $15/16$ inch diameter. The tapered duct 31 can be a truncated right cone 4 inches long and flaring about 7° from the axis. With feed made of ground corn, for example, satisfactory results are obtained by rotating the horizontal auger at 1550 r.p.m. and the vertical auger at a speed of 2200 r.p.m. At these speeds, the injector can handle about 2000 pounds of material per hour with an air speed of 25 cubic feet of air per minute through a 1 inch I.D. pipe.

As described above, the vertical auger and the pneumatic conveying system can accommodate all of the material passed by the horizontal auger. Accordingly, the latter acts as a limiter, and the amount of feed distributed by the system can be controlled by regulating the speed of the horizontal auger. This can be accomplished by means of conventionally available speed reduction gears, transmissions, and the like (not shown).

In the embodiment shown in FIGURES 4 and 5, as already described above, the vertical auger 18, together with housing 19, and vertical truncated right conical duct 31 are replaced by the single tapered, upwardly curved duct 46. This duct, as will be apparent from FIGURE 5, is of rectangular cross section at any given point. For the purpose of using it with the specific apparatus described to illustrate the embodiment of FIGURES 1 and 2, the short and long radii may be 2½ and 5½ inches, respectively, the center of the longer arc being about ¾ inch vertically above the center of the shorter arc and about the same distance below the center of the mixing chamber.

Although both embodiments of the invention have been illustrated with reference to apparatus having specific dimensions, it will be obvious to those skilled in the art that these dimensions are merely illustrative, but not a limitation on the scope of the invention. Thus, it will be apparent that the size and/or the speed of the augers, as well as the amount of air and the diameter of the conveying pipes can be varied to handle greater or smaller quantities of material, as desired.

It will further be apparent that the utility of the apparatus is not limited to conveying of feed but can be used for injecting any particulate material into a pneumatic conveying system without departing from the spirit of the invention.

Having described our invention in detail, what we claim is as follows:

1. Apparatus for injecting particulate material into a pneumatic distribution system comprising:
   (a) storage means for holding particulate material to be distributed comprising a hopper and a horizontal trough at the bottom of the hopper;
   (b) a horizontally disposed auger mounted for rotation in said trough;
   (c) a vertically disposed auger with its lower, input end mounted adjacent the output end of the horizontal auger;
   (d) a mixing chamber for mixing a stream of air with particulate material, said mixing chamber having air inlet means at one end and air outlet means at the other end; and
   (e) a vertical tapered duct connecting the output end of the vertical auger with the mixing chamber, the smaller end of said duct being connected to the vertical auger.

2. Apparatus for injecting particulate material into a pneumatic distribution system comprising:
   (a) storage means for holding particulate material to be distributed comprising a hopper and a horizontal open-top trough at the bottom of the hopper;
   (b) a horizontally disposed auger mounted for rotation in said trough, the output end of said horizontal auger extending a short distance beyond the hopper;
   (c) a housing comprising a horizontal section and a vertical section connected thereto, said horizontal section being connected to the hopper and enclosing the output end of the horizontal auger;
   (d) a vertically disposed auger mounted for rotation within the vertical section of the housing, the input end of said vertical auger being adjacent the output end of the horizontal auger;
   (e) a mixing chamber for mixing a stream of air with particulate material, said mixing chamber having air inlet means at one end and air outlet means at the other end; and
   (f) a vertical tapered duct connecting the upper end of the vertical section of the housing with the mixing chamber, the smaller end of said duct being connected to the housing.

3. Apparatus for injecting particulate material into a pneumatic distribution system consisting of:
   (a) storage means for holding particulate material to be distributed comprising a hopper and a horizontal open-top trough at the bottom of the hopper;
   (b) a horizontally disposed auger mounted for rotation in said trough, the output end of the auger projecting a short distance beyond the trough;
   (c) a mixing chamber located above the output end of the auger for mixing a stream of air with particulate material, said mixing chamber having air-inlet means at one end an outlet means at the other end for discharging air-borne particulate material; and
   (d) a curved, tapered duct connecting the output end of the auger with the mixing chamber, the smaller end of the tapered duct enclosing the projecting end of the auger and the larger end of the tapered duct being connected to the mixing chamber, whereby the air pressure in the mixing chamber and gravity combine to pack particulate material in front of the output end of the auger to a density sufficient to prevent blowback of air into the auger.

References Cited by the Examiner

UNITED STATES PATENTS

| 1,258,911 | 3/18 | Kinyon | 302—50 |
| 1,505,188 | 8/24 | Burns | 302—50 |
| 1,675,090 | 6/28 | Burns | 302—50 |
| 2,067,583 | 1/37 | Stark | 198—64 |
| 2,127,693 | 8/38 | McCanless | 302—50 |
| 2,256,407 | 9/41 | O'Brian | 198—64 |
| 2,813,704 | 11/57 | MacKissic | 198—64 |

FOREIGN PATENTS 845,251  5/39  France.

SAMUEL F. COLEMAN, *Primary Examiner.*

ANDRES H. NIELSEN, ERNEST A. FALLER, JR., *Examiners.*